(12) United States Patent
Fincher et al.

(10) Patent No.: US 9,808,739 B2
(45) Date of Patent: Nov. 7, 2017

(54) DISTILLATION SOLIDS REMOVAL SYSTEM AND METHOD

(75) Inventors: Roger Fincher, Conroe, TX (US); Dan Owen, Salt Lake City, UT (US)

(73) Assignee: 212 WATER SERVICES, LLC, Broomfield, CO (US)

( * ) Notice: Subject to any disclaimer, the term of this patent is extended or adjusted under 35 U.S.C. 154(b) by 449 days.

(21) Appl. No.: 14/239,412

(22) PCT Filed: Aug. 16, 2012

(86) PCT No.: PCT/US2012/051082
§ 371 (c)(1),
(2), (4) Date: Feb. 24, 2014

(87) PCT Pub. No.: WO2013/025875
PCT Pub. Date: Feb. 21, 2013

(65) Prior Publication Data
US 2014/0224640 A1 Aug. 14, 2014

Related U.S. Application Data

(60) Provisional application No. 61/524,860, filed on Aug. 18, 2011.

(51) Int. Cl.
*B01D 3/00* (2006.01)
*B01D 17/02* (2006.01)
*B01D 17/04* (2006.01)
*B01D 21/26* (2006.01)

(52) U.S. Cl.
CPC .............. *B01D 3/00* (2013.01); *B01D 3/007* (2013.01); *B01D 17/0217* (2013.01); *B01D 17/041* (2013.01); *B01D 21/262* (2013.01)

(58) Field of Classification Search
CPC ........ B01D 3/00; B01D 3/007; B01D 21/262; B01D 21/265; C02F 1/04; C02F 11/00
See application file for complete search history.

(56) References Cited

U.S. PATENT DOCUMENTS

| | | | |
|---|---|---|---|
| 3,105,021 A | | 9/1963 | Randall |
| 3,923,644 A | * | 12/1975 | Hindman ............. C10M 175/00 159/2.3 |
| 3,957,588 A | * | 5/1976 | Humiston ................ B01D 1/00 159/17.3 |

(Continued)

FOREIGN PATENT DOCUMENTS

| | | | |
|---|---|---|---|
| GB | 873592 A | 7/1961 | |
| GB | 1445140 A | 8/1976 | |
| KR | 20010059420 | * 7/2001 | .............. C02F 11/00 |

OTHER PUBLICATIONS

International Search Report and Written Opinion issued in connection with the corresponding International Application No. PCT/US2012/051082 on Nov. 19, 2012.

*Primary Examiner* — Jonathan Miller

(57) ABSTRACT

A distillation system and method. The system includes a recirculation pump and a separation system for receiving a multi-media fluidic solution and operating at a temperature different than ambient temperature and at a pressure different than ambient pressure. The system further includes a separator for separating heavier particles from the multi-media fluidic solution. The separator separates heavier particles from the multi-media fluidic solution at the temperature and pressure of the separation system.

9 Claims, 7 Drawing Sheets

(56) References Cited

U.S. PATENT DOCUMENTS

| | | | |
|---|---|---|---|
| 4,231,764 A | 11/1980 | Mattia | |
| 5,147,421 A | 9/1992 | Yung | |
| 5,470,465 A | 11/1995 | Moorehead et al. | |
| 5,587,054 A * | 12/1996 | Keith | B01D 1/2856 159/24.1 |
| 6,217,711 B1 * | 4/2001 | Ryham | B01D 1/2846 159/16.3 |
| 6,322,710 B1 | 11/2001 | Katsumata et al. | |
| 6,365,005 B1 | 4/2002 | Schleiffarth | |
| 6,536,523 B1 * | 3/2003 | Kresnyak | B01D 1/0047 166/266 |
| 6,551,466 B1 * | 4/2003 | Kresnyak | B01D 1/0047 159/24.1 |
| 6,589,395 B1 * | 7/2003 | Meili | B01D 3/007 165/108 |
| 6,615,817 B2 | 9/2003 | Horio | |
| 6,984,292 B2 * | 1/2006 | Kresnyak | B01D 1/0047 159/24.1 |
| 7,179,379 B2 * | 2/2007 | Appel | B01D 3/009 210/321.67 |
| 7,428,926 B2 * | 9/2008 | Heins | C02F 1/04 159/24.1 |
| 7,438,129 B2 * | 10/2008 | Heins | C02F 1/04 159/24.1 |
| 7,476,296 B2 * | 1/2009 | Appel | B01D 3/009 202/118 |
| 7,476,775 B2 | 1/2009 | Kreischer | |
| 7,837,768 B2 * | 11/2010 | Sanderson | B01D 1/16 165/108 |
| 7,842,121 B2 * | 11/2010 | Sanderson | B01D 1/16 165/108 |
| 8,003,833 B2 * | 8/2011 | Appel | B01D 3/009 585/240 |
| 8,062,522 B1 * | 11/2011 | Culler | B01D 61/12 210/170.03 |
| 2003/0046867 A1 | 3/2003 | Woods et al. | |
| 2003/0047499 A1 * | 3/2003 | Levitin | C02F 9/00 210/182 |
| 2008/0006011 A1 | 1/2008 | Larnholm et al. | |

* cited by examiner

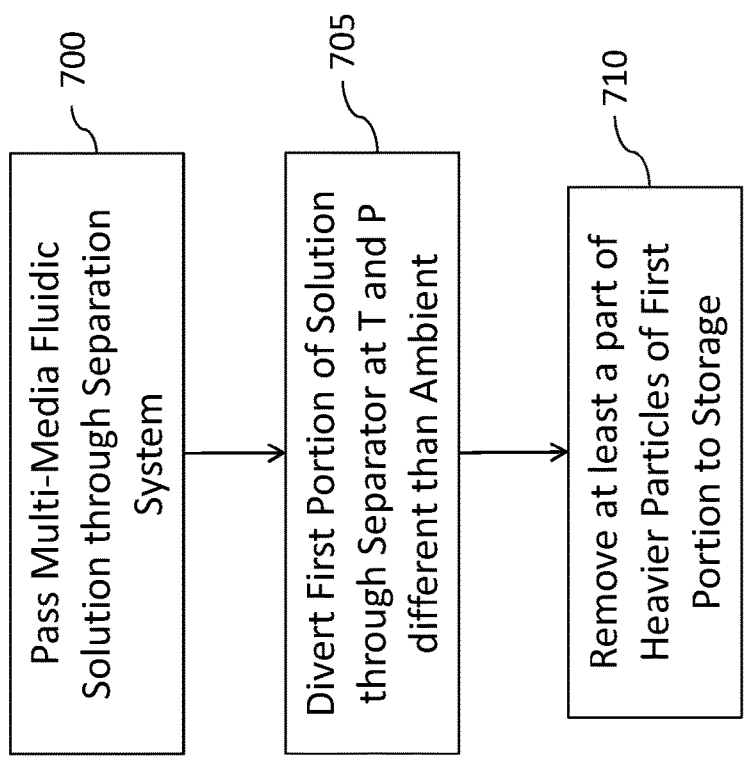

DISTILLATION SOLIDS REMOVAL SYSTEM AND METHOD

The present application is U.S. national phase application under 35 U.S.C. §371 of international application PCT/US2012/051082, filed on Aug. 16, 2012, which claims priority to U.S. provisional patent application No. 61/524,860, filed on Aug. 18, 2011.

FIELD

The invention relates to a distillation system and method, and more particularly, to a distillation system and method for removing solids and slurry from effluent distillation underflow.

BACKGROUND

Systems used in distillation and the removal of solids have been used in a myriad of industrial applications for many years. Some known distillation techniques utilize mechanical separation devices such as centrifuges, hydrodynamic separation like hydro-cyclones, filters and/.or filter presses, gravity box separators, cone bottom tanks, and sluice flumes and ladder trays, to name a few. In conventional distillation processes, a process stream is circulated and, through a variety of known techniques, a distilled stream is removed from the process. However, as the process fluid continues to circulate through conventional distillation and concentration systems and as distilled fluid is removed therefrom, the concentration level of suspended particles within the recirculating concentrate increases. If the concentration level rises to slightly above the saturation point of the recirculating concentrate, a common side-effect is fouling of any heat exchangers within the recirculating process.

Another disadvantage of known distillation systems is that the process streams being distilled must be above or below atmospheric pressure and temperature. In conventional distillation processes, atmospheric pressure and temperature are typically used as the base state for the process. The degree to which these processes deviate from atmospheric pressure and temperature drives the process and determines the overall efficiency of the process. In most conventional applications which require separation, mechanical and thermal inefficiencies occur due to the need to bring the separation process pressure and temperature in line with ambient conditions during separation. Mechanical and/or thermal additions to the process lower the efficiency of these known distillation systems. Furthermore, reducing (or in some instances increasing) process pressure and/or temperature to ambient conditions may lead to additional scaling and other solids-related hurdles, thus making such known distillation systems less attractive.

With some of these concerns in mind, an improved distillation system and method would be welcome in the art.

SUMMARY

An embodiment of the invention provides a distillation system that includes a recirculation pump and a separation system for receiving a multi-media fluidic solution, the separation system operating at a temperature different than ambient temperature and at a pressure different than ambient pressure. The distillation system further includes a separator for separating heavier particles from the multi-media fluidic solution. The separator separates heavier particles from the multi-media fluidic solution at the temperature and pressure of the separation system.

One aspect of the embodiment provides a distillation system that includes a containment vessel for containing a multi-media fluidic solution having heavier particles and lighter particles, a recirculation pump, a separation system for receiving the multi-media fluidic solution from the containment vessel, and a transmission line for transporting the multi-media fluidic solution from the containment vessel and through the separation system at a temperature elevated above ambient temperature and at a pressure elevated above ambient pressure. The separation system includes a separator for separating a portion of the heavier particles from the multi-media fluidic solution, wherein the separator comprises a discharge pipe for transporting a fluid containing a portion of the lighter particles from the separator, a slip stream line for transmitting a portion of the multi-media fluidic solution through the separation system, and an underflow line for transmitting the portion of the heavier particles from the separator back to a storage system. The separator separates the heavier particles from the multi-media fluidic solution at the elevated temperature and pressure.

An embodiment of the invention includes a method for removing heavier particles from a multi-media fluidic solution. The method includes passing a multi-media fluidic solution having heavier particles through a separation system at a temperature different than ambient temperature and at a pressure different than ambient pressure, diverting a first portion of the multi-media fluidic solution into a separator at or near the temperature different than ambient temperature and the pressure different than ambient pressure, and removing at least some of the heavier particles from the first portion and transporting them to a storage system.

These and other features, aspects and advantages of the present invention may be further understood and/or illustrated when the following detailed description is considered along with the attached drawings.

DESCRIPTION OF THE DRAWINGS

FIG. 7 illustrates a process for removing heavier particles from a multi-media fluidic solution in accordance with another embodiment of the invention.

DETAILED DESCRIPTION

The present specification provides certain definitions and methods to better define the embodiments and aspects of the invention and to guide those of ordinary skill in the art in the practice of its fabrication. Provision, or lack of the provision, of a definition for a particular term or phrase is not meant to imply any particular importance, or lack thereof; rather, and unless otherwise noted, terms are to be understood according to conventional usage by those of ordinary skill in the relevant art.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation.

The modifier "about" used in connection with a quantity is inclusive of the stated value and has the meaning dictated by the context (e.g., includes the degree of error associated with measurement of the particular quantity). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Figure 1:
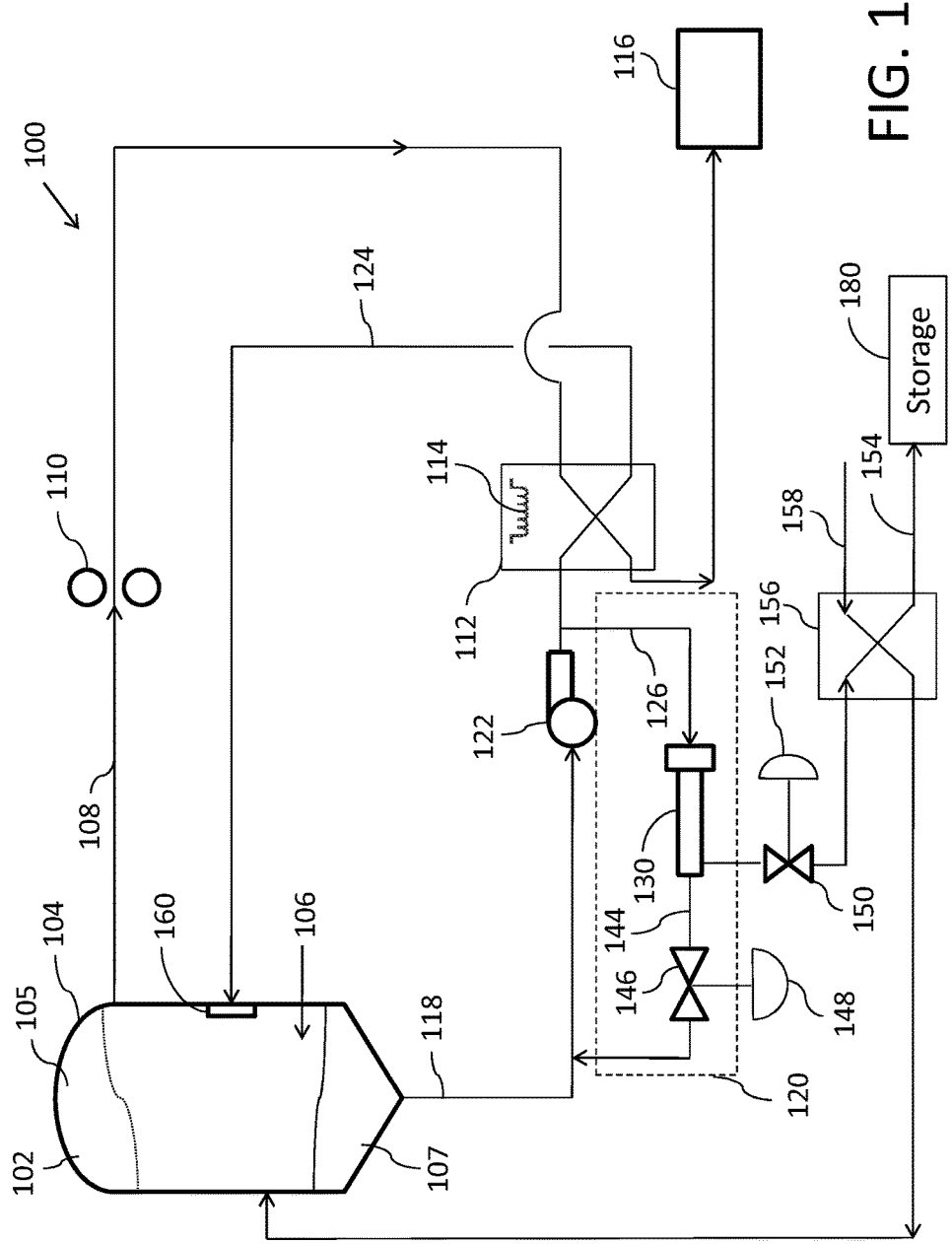
FIG. 1 is a schematic view of a distillation system in accordance with an embodiment of the invention.

With specific reference to FIG. 1, there is shown an exemplary embodiment of the invention. Specifically, there is shown a high-concentrate slurry system 100. The system 100 includes a containment vessel (CV) 102, a heat exchanger 112, a separator system 120, and a recirculation pump 122.

The CV 102 includes an upper portion 104 into which vapor 105 migrates and a lower portion 106 where fluid 107 with entrained particles resides. This multi-media fluidic solution 107 exits the CV 102 through a recirculation line 118 and is transmitted to the separator system 120.

The fluid 107 is pumped into the separator system 120 by the recirculation pump 122. As the fluid 107 exits the recirculation pump 122, a first portion of it continues on to an in-line axial separator 130 within the separator system 120, while a second portion is transmitted through the heat exchanger 112. The separator system 120 further includes a slip stream valve 146.

The vapor 105, which in one embodiment comprises a supersaturated stream of water and light hydrocarbons, is transmitted from the CV 102 through a vapor line 108 to the heat exchanger 112. A blower 110 propels the vapor 105 through the vapor line 108 to the heat exchanger 112 and adds pressure and heat to the vapor stream. The vapor 105 gives up heat to the second portion of the fluid 107 in the heat exchanger 112. In one embodiment, the vapor 105 is condensed at approximately 900 BTU/lb. The vapor 105 that has been condensed in the heat exchanger 112 is further transmitted to an effluent outflow 116 for further processing.

Added heat 114, in the form of a separate heating system, may be included within the heat exchanger 112 and may be utilized on an as needed basis. For example, the added heat 114 may be a glycol heater and it may be utilized as make-up heat upon start up of the system 100.

The heated second portion of the fluid 107 exits the heat exchanger 112 and is transmitted back to the CV 102 through a recirculation return line 124. The recirculation return line 124 enters the CV 102 through a sparger 160, which serves to transform approximately 0.5 percent of the returning heated second portion of the fluid 107 into vapor 105, the remaining approximately 99.5 percent remaining the heated fluid 107.

Figure 2:
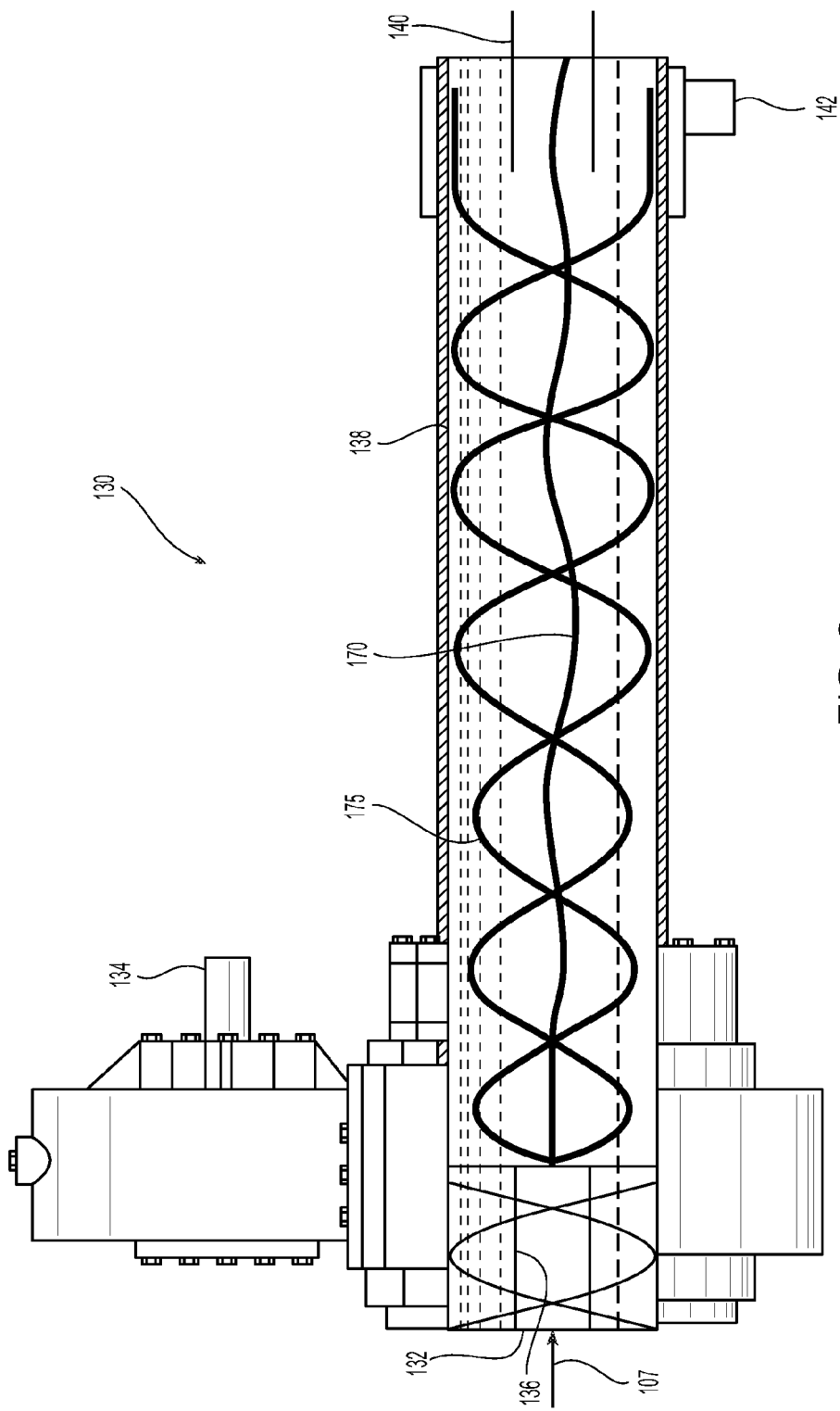
FIG. 2 is a schematic view of the in-line axial separator of FIG. 1.

The first portion of the fluid 107 enters the in-line axial separator 130 through the slip stream line 126. With specific reference to FIG. 2, the separator 130 includes an inlet 132 at one end of an axial flow tube 138 and a discharge outlet 140 and a spin-off manifold 142 at an opposing end of the flow tube. Within the flow tube 138 near the inlet 132 are impeller blades 136, which are driven by a drive shaft 134.

In operation, the first portion of the fluid 107 enters the separator 130 through an inlet 132. The drive shaft 134 serves to rotate the impeller blades 136. In one embodiment of the invention, the rotation of the impeller blades 136 creates forces in the range of 350 to 500 gravities within the flow tube 138. The rotation of the blades 136 causes the first portion of the fluid 107 to separate within the flow tube 138. Specifically, the part of the first portion of the fluid 107 having less and/or smaller particles forms a light-density effluent stream 170 and remains generally in the radial interior of the flow tube 138. Centrifugal force causes the part of the first portion of the fluid 107 with more and/or heavier particles, termed a higher-density flow stream 175, radially outward within the flow tube 138. Due to the relative positioning of the light-density flow stream 170 and the higher-density flow stream 175, the cleaned fluid discharge outlet 140 serves to discharge at least a portion of the light-density flow stream 170 from the separator 130, while the spin-off manifold 142 serves to discharge at least a portion of the higher-density flow stream 175 from the separator 130.

It is to be understood that the rotation of the impeller blades 136 is intended to separate the fluid 107 into two parts, generally a lower density part (generally termed a light-density flow stream 170 which exits the separator 130 through the cleaned fluid discharge outlet 140) and a higher density part (generally termed a higher-density flow stream 175 which exits the separator 130 through the spin-off manifold 142). The light-density flow stream 170 may contain some heavy particulates, just as the higher-density flow stream 175 may contain some lighter particulates. In general, however, the light-density flow stream 170 should have an overall density that is less than the higher-density flow stream 175.

The light-density flow stream 170 leaves the cleaned fluid discharge outlet 140 through a recirculation line 144. The slip stream valve 146, with a pressure and flow control valve 148, controls the flow rate Q of the light-density flow stream 170 passing through separator 130 and back into the recirculation line 118, where it re-enters the recirculation pump 122.

The higher-density flow stream 175 exits the spin-off manifold 142 through an underflow line 154. From the spin-off manifold 142, the higher-density flow stream 175 is transmitted through a spin-off valve 150, which is controlled by pressure and flow controls 152 and on to a concentrate cooler 156. The pressure and flow controls, such as controls 152, assist in controlling and balancing the overall system flow rates as well as the device specific flows. Feed water in a feed water line 158 obtains heat from the higher-density flow stream 175 in the concentrate cooler 156. The heated feed water is transmitted to the CV 102. The now cooled higher-density flow stream 175 exits the concentrate cooler 156 through the underflow line 154 and is transmitted to a storage system 180.

Since the separator 130 is operating at a temperature and pressure different than ambient temperature and pressure, the underflow line 154 may require pressure and/or temperature modulation. For example, if the operating pressure of the separator 130 is noticeably above the pressure in the storage system 180, a flow and pressure control valve may be required. Further, if the process temperature is significantly above the temperature of the storage system 180, a heat exchanger or flash valve may be utilized. If the pressure and flow magnitudes are of significant enough amounts, a recovery of that energy can be added to the system 100. If the temperature and flow magnitudes are of significant enough amounts, a recovery of the thermal energy can be added to the system 100.

Figure 3:
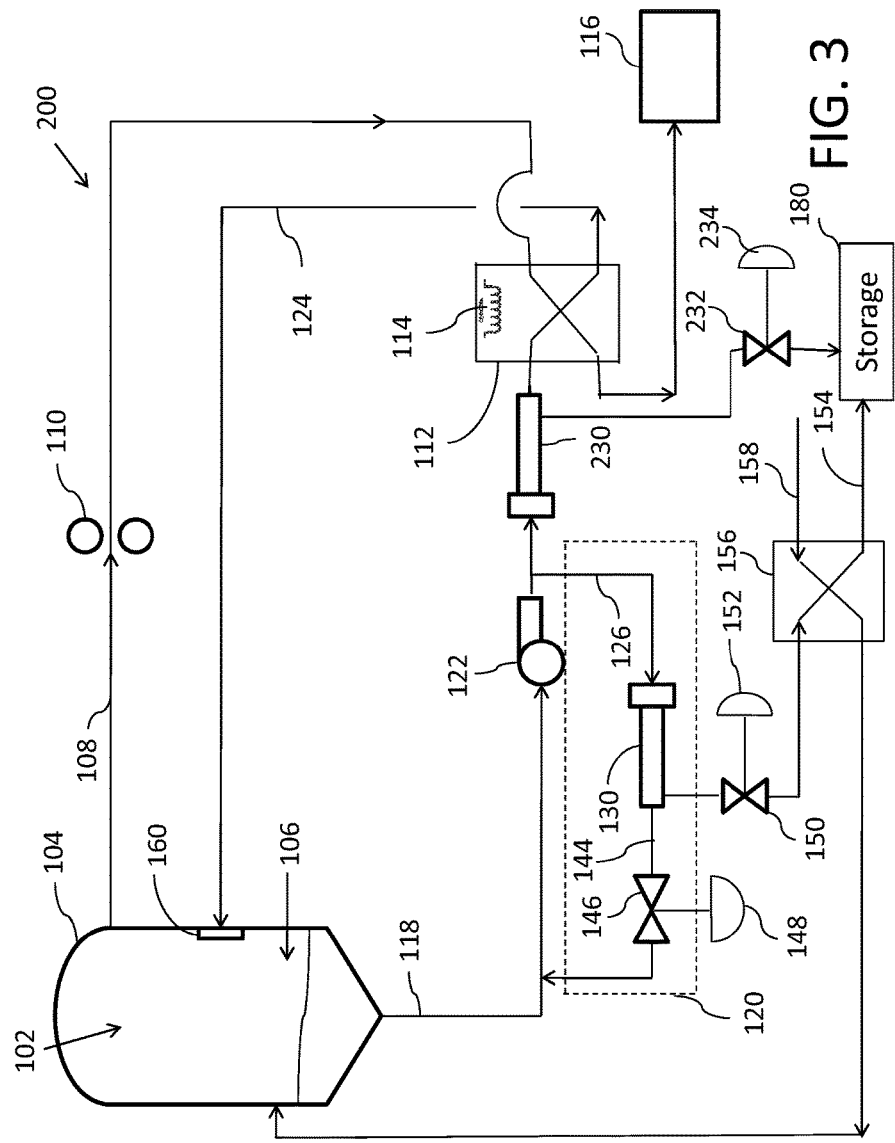
FIG. 3 is a schematic view of a distillation system in accordance with another embodiment of the invention.

With specific reference to FIG. 3, there is shown an exemplary embodiment of the invention. Specifically, there is shown a high-concentrate slurry system 200. The high-concentrate slurry system 200 is somewhat similar to the high-concentrate slurry system 100 of FIG. 1. However, the location and number of separators is different.

Specifically, a second separator 230 is positioned upstream of the heat exchanger 112 on the recirculation return line 124. The second separator 230 may function similarly to the separator 130. In particular, the second separator 230 may include impeller blades that cause a centrifugal force within the flow tube, causing higher-density flow to migrate radially outward within the flow tube, leaving light-density flow to travel through a central portion of the flow tube. The light-density flow exits the second separator 230 through the recirculation return line 124 and is transmitted through the heat exchanger 112 to the CV 102 through the sparger 160. The higher-density flow exits the second separator 230 through a spin-off manifold and is transmitted through a valve 232 to the storage system 180. A pressure and flow controller 234 is positioned with the valve 232 and is used to assist in stepping the pressure and/or flow of the higher-density flow into the storage 180 up or down as needed.

The flow of fluid entering the second separator 230 may be significant, and so the second separator 230 may need to be considerably larger and able to handle considerably more flow than the separator 130. For example, in one embodiment of the system 200, 7000 gallons per minute (gpm) of the multi-media fluidic solution 107 exits the containment vessel (CV) 102 through the recirculation line 118. Of that fluid 107, approximately 15 gpm is portioned off as the first portion of the fluid 107 to go through the separator system 120, and specifically the separator 130. The remaining 6985 gpm of fluid 107 (the second portion of the fluid 107) is transmitted through the heat exchanger 112 and then into the second separator 230.

Alternatively, the second portion of the fluid 107 can exit the heat exchanger 112 and be transmitted to a bank of separators 230 in parallel. Each of the bank of separators 230 would function similarly to the single separator 230 described above. The bank of separators 230 would allow for the very large flow exiting the heat exchanger 112 to be handled efficiently. As the flow increased, additional separators 230 could be easily added to the bank of separators as needed.

Figure 4:
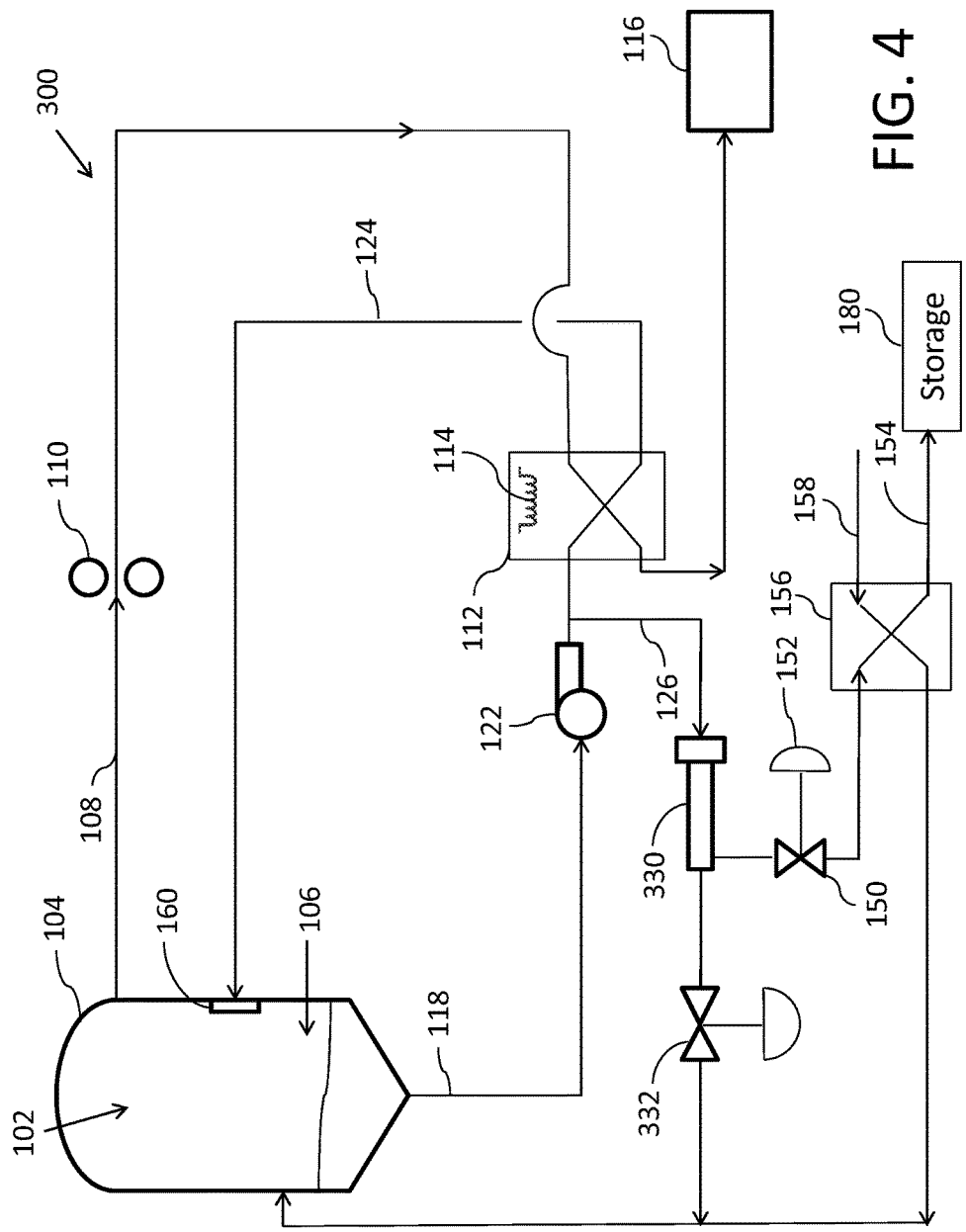
FIG. 4 is a schematic view of a distillation system in accordance with another embodiment of the invention.

With specific reference to FIG. 4, there is shown an exemplary embodiment of the invention. Specifically, there is shown a high-concentrate slurry system 300, similar in nature and function to the high-concentrate slurry system 100 (FIG. 1) and 200 (FIG. 3). In the system 300, the multi-media fluidic solution 107 exits the CV 102 via recirculation line 118 and enters the recirculation pump 122. Upon exiting the recirculation pump 122, the fluid 107 is split into two portions, the first portion being transmitted to an axial separator 330. The separator 330 functions similarly to the separator 130 (FIG. 1). The higher-density flow stream 175 exits the separator 330 through a spin-off manifold and is transmitted to a storage system. The light-density flow stream 170 exits the separator 330 through a cleaned fluid discharge outlet and is transmitted through a pressure and flow control valve 332 back to the CV 102. The second portion of the flow exiting the recirculation pump 122 is transmitted through the heat exchanger 112 enroute to the CV 102 through the recirculation return line 124.

Figure 5:
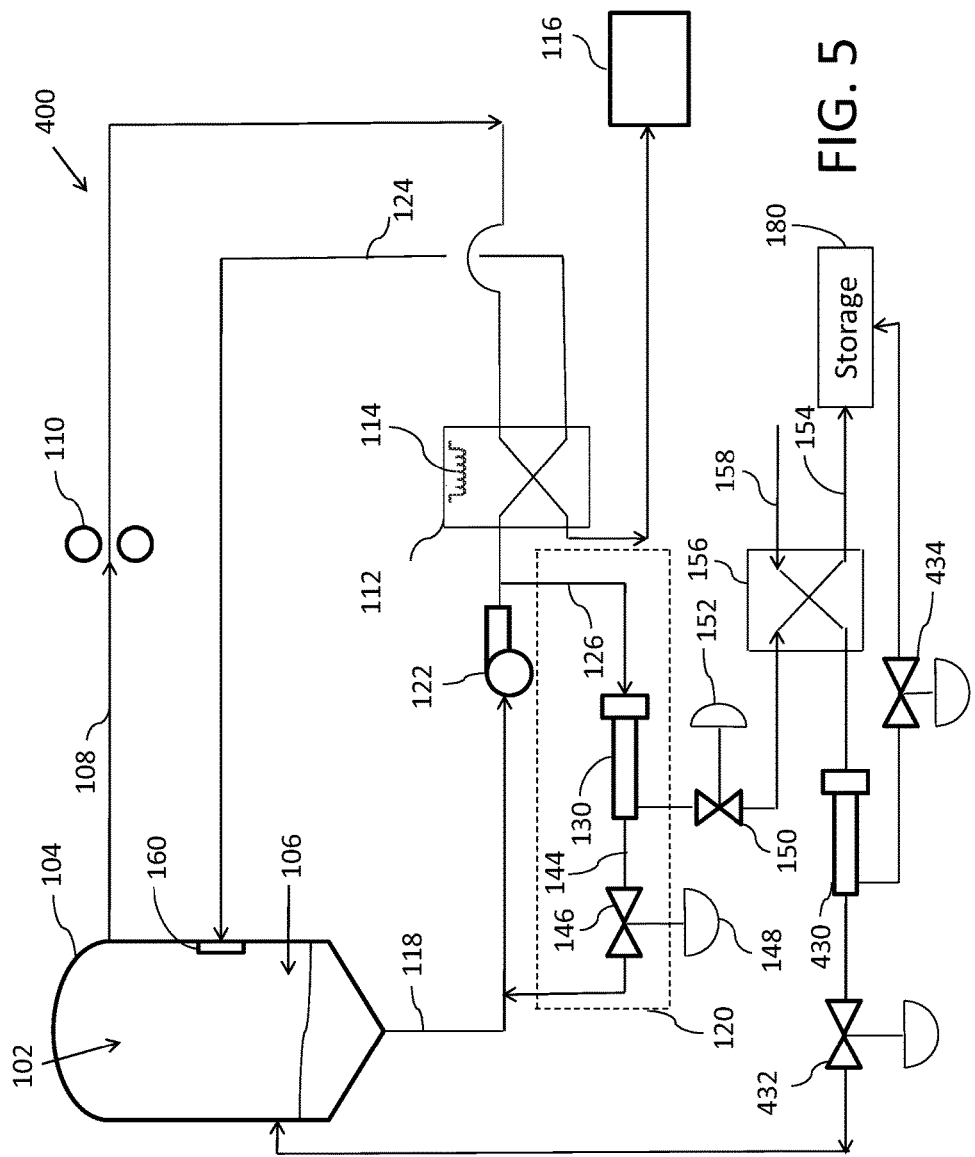
FIG. 5 is a schematic view of a distillation system in accordance with another embodiment of the invention.

With specific reference to FIG. 5, there is shown an exemplary embodiment of the invention. Specifically, there is shown a high-concentrate slurry system 400, similar in nature and function to the high-concentrate slurry system 200 (FIG. 3). Specifically, the system 400 includes two separators, the separator 130 located within the separator system 120 and a second separator 430 located between the concentrate cooler 156 and the containment vessel 102 on the feed water line 158. In operation, feed water exchanges heat with the higher-density flow stream 175 in the concentrate cooler 156 and then enters the second separator 430. As the fed water is heated by the heat exchanger/concentrate cooler 156, the saturation and solids suspension balance may change and separation at that point could reduce solids entering CV 102. A light-density flow stream will exit the separator 430 and be transmitted, through a pressure and flow control valve 432, back to the containment vessel 102. The higher-density flow stream will exit the separator 430 and pass through a pressure and flow control valve 434 and on to the storage system 180.

Figure 6:
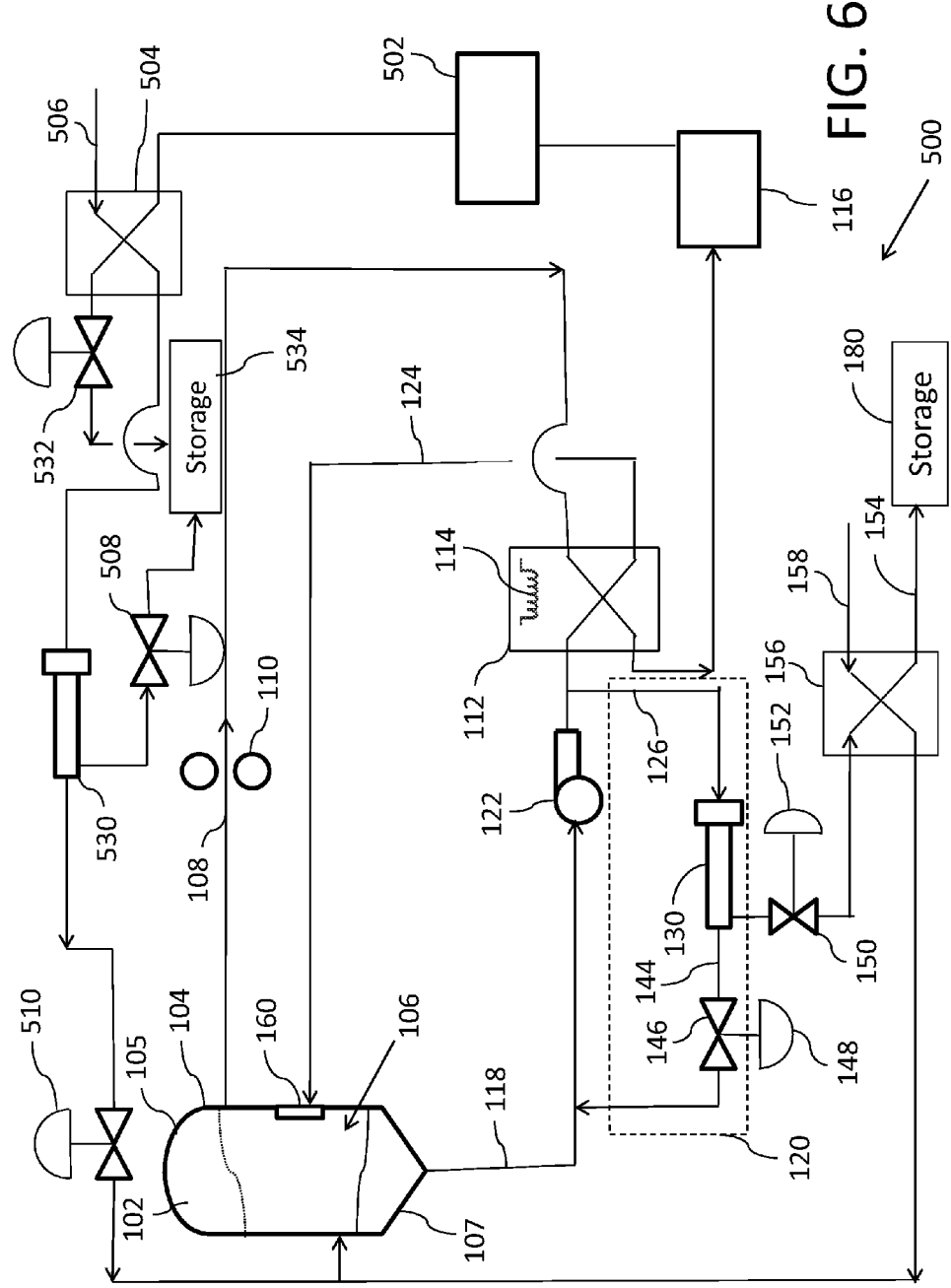
FIG. 6 is a schematic view of a distillation system in accordance with another embodiment of the invention.

With specific reference to FIG. 6, there is shown an exemplary embodiment of the invention. Specifically, there is shown a high-concentrate slurry system 500, similar in nature and function to the high-concentrate slurry system 100 (FIG. 1), 200 (FIG. 3), 300 (FIG. 4) and 400 (FIG. 5). The system 500 differs from the other described and illustrated systems in that it includes a downstream processing system for the effluent outflow 116. As noted previously, the condensate of the vapor 105 may contain entrained hydrocarbons. The effluent outflow 116 may include a stripper system 502 to strip out the hydrocarbons from the condensate of the vapor 105. The stripper system 502 is a distillation process in which water represents the heavier portion and organics, such as volatile organics, represent the lighter portion being stripped out. The stripped hydrocarbons are sent to a storage system, like the storage system 180. The remaining hot fluid is transmitted to a heat exchanger 504, in which it exchanges heat with a cool feed water line 506. The now cooled fluid from the stripper system 502 is sent to an offsite storage system, like storage system 534.

The now heated feed water line 506 is transmitted to a separator 530, which may function similarly to the separators 130, 230, 330 and 430. The higher-density flow stream exits the separator 530 and is transmitted through a pressure and flow control device 508 to a storage system, like the storage system 534. The light-density flow stream exits the separator and is transmitted through a pressure and flow control device 510 back to the containment vessel 102.

With specific reference to FIG. 7, and general reference to FIGS. 1-6, next will be described a method for removing heavy particles from a multi-media fluidic solution, such as, for example, the multi-media fluidic solution 107. At Step 700, the multi-media fluidic solution is passed into and through a separation system. The separation system may be the separation system 120 (FIGS. 1, 3, 5, 6) or the separation system 330 (FIG. 4). Importantly, the multi-media fluidic solution is passed through the separation system at a temperature different than ambient temperature and at a pressure different than ambient pressure. Those temperatures and pressures are at values much closer to ambient than conventional systems. For example, in one embodiment the temperature may be at approximately 245° F. and the pressure may be between 15 and 20 psi.

Next, at Step 705, a first portion of the multi-media fluidic solution is diverted into a separator at or near the temperature different than ambient temperature and the pressure different than ambient pressure. The separator may be, for example, separator 130 (FIGS. 1, 3, 5, 6) or the separation system 330 (FIG. 4). When the overall process pressure and temperature are close to ambient, the absolute value of that pressure and temperature as a percentage above or below ambient parameters can be rather large. However, even though the percentages are large, the absolute energy losses are not that substantial and therefore the temperature and pressure differentials (ΔT, ΔP) used to calculate overall process efficiency make much difference. However, as the overall process temperature and/or pressure move away from ambient parameters, then the temperature and pressure differentials ΔT, ΔP must be held smaller to maintain the same overall process efficiency.

At Step 710, at least a portion of the heavier particles from the first portion are removed and transported to a storage system. The storage system may be, for example, the storage system 180 (FIGS. 1 and 3-6). The removal may be accomplished through the use of separator 130 in the separation system 120, for example, or it may be accomplished through the use of separator 230 (FIG. 3), either alone or in conjunction with the separator 130. Further, the removal can be accomplished through the use of separators 330, 430 and 530 (FIGS. 4, 5, and 6, respectively).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while embodiments have been described in terms that may initially connote singularity, it should be appreciated that multiple components may be utilized. Additionally, while various embodiments of the invention have been described, it is to be understood that aspects of the invention may include only some of the described embodiments. Further, while some embodiments have described separators in series or parallel throughout the process, it should be understood that additional separators can be incorporated at other locations within the process that have not been described to remove additional solids and inhibit fouling as described herein. Accordingly, the invention is not to be seen as limited by the foregoing description, but is only limited by the scope of the appended claims.

What is claimed as new and desired to be protected by Letters Patent of the United States is:

1. A method for processing a liquid and a vapor contained in a containment vessel comprising the steps of transporting a liquid phase effluent stream out of the containment vessel;
   (ii) separating the liquid phase effluent stream into a first liquid stream and a second liquid stream at an elevated temperature and pressure above the ambient temperature and pressure;
   (iii) exchanging heat between at least a portion of the second liquid stream and a vapor stream from the containment vessel;
   (iv) circulating the at least portion of the second liquid stream to the containment vessel;
   (v) separating all of the first liquid stream into two liquid phase streams, a light liquid phase stream and a heavy liquid phase stream, while maintaining the light liquid phase stream and the heavy liquid phase stream at the elevated temperature and pressure above the ambient temperature and pressure, wherein the density of the heavy liquid phase stream is higher than the density of the light liquid phase stream;
   (vi) removing the heavy liquid phase stream; and
   (vii) circulating the light liquid phase stream to combine with the liquid effluent stream or to the containment vessel.

2. The method of claim 1, wherein the heavy liquid phase stream exchanges heat with a feed liquid for the containment vessel.

3. The method of claim 2, wherein the feed liquid is separated into a light feed liquid and a heavy feed liquid, wherein the density of the heavy feed liquid is higher than the density of the light feed liquid and wherein the light feed liquid is transported to the containment vessel.

4. The method of claim 1, wherein all of the second liquid stream is separated into a second light liquid phase stream and a second heavy liquid phase stream at an elevated temperature and pressure above the ambient temperature and pressure, wherein the density of the second heavy liquid phase stream is higher than the density of the second light liquid phase stream, and wherein the second light liquid phase stream exchanges heat with the vapor stream.

5. The method of claim 1, wherein the vapor stream further exchanges heat with a second feed liquid for the containment vessel.

6. The method of claim 5, wherein the vapor stream condenses before exchanging heat with the second feed liquid.

7. The method of claim 1, wherein the vapor stream is stripped to remove lower density fluid.

8. The method of claim 5, wherein the second feed liquid is separated into a second light feed liquid and a second heavy feed liquid, wherein the density of the second heavy feed liquid is higher than the density of the second light feed liquid and wherein the second light feed liquid is transported to the containment vessel.

9. A method for processing a liquid and a vapor contained in a containment vessel comprising the steps of
   (i) transporting a liquid stream out of the containment vessel;
   (ii) separating the liquid stream into a first liquid stream and a second liquid stream;
   (iii) exchanging heat between at least a portion of the second liquid stream and a vapor stream from the containment vessel;
   (iv) transporting the at least portion of the second liquid stream to the containment vessel;
   (v) separating all of the first liquid stream into two liquid phase streams, a light liquid phase stream and a heavy liquid phase stream, while maintaining the light liquid phase stream and the heavy liquid phase stream at an elevated temperature and pressure above the ambient temperature and pressure, wherein the density of the heavy liquid phase stream is higher than the density of the light liquid phase stream; and
   (vi) transporting the light liquid phase stream into the containment vessel via a sparger so that a part of the light liquid phase stream is converted to vapor within the containment vessel.

* * * * *